United States Patent [19]

Kazmark

[11] 4,221,402
[45] Sep. 9, 1980

[54] GARMENT BAG ATTACHMENT FOR PORTABLE LUGGAGE CARRIER

[76] Inventor: Eugene A. Kazmark, 5 Remin La., Joliet, Ill. 60433

[21] Appl. No.: 917,527

[22] Filed: Jun. 21, 1978

[51] Int. Cl.² .......................... B62B 1/26; B62B 1/14
[52] U.S. Cl. ................................. 280/659; 280/47.18; 280/47.19; 280/655
[58] Field of Search .............. 280/47.19, 47.18, 47.17, 280/659, 635, 654, 653, 655, 47.35, 47.27, 47.28, 47.29, 47.37 R; 223/120; 190/18 A, 18 R; 224/42.45 A, 42.46 A

[56] References Cited

U.S. PATENT DOCUMENTS

| 2,647,669 | 8/1953 | White | 224/42.45 A |
|---|---|---|---|
| 2,727,753 | 12/1955 | Johnson et al. | 280/47.37 R |
| 2,778,515 | 1/1957 | Hanson | 280/47.27 X |
| 2,858,140 | 10/1958 | Stamp | 280/655 |
| 3,612,563 | 10/1971 | Kazmark, Sr. | 280/655 |
| 3,948,537 | 4/1966 | Black | 280/654 |
| 3,998,476 | 12/1976 | Kazmark, Sr. | 280/655 |

FOREIGN PATENT DOCUMENTS 500044  2/1954  Canada ........................... 280/47.37 R Primary Examiner—John J. Love
Assistant Examiner—Milton L. Smith

[57] ABSTRACT

A garment bag attachment is removably mounted on a portable luggage carrier. The luggage carrier includes a base and a handle assembly extending upwardly from the base. The handle assembly includes a pair of spaced-apart handle members and a cross brace connecting the handle members at their upper ends. The garment bag attachment includes a wire frame which is bent into an inverted U shape with a pair of parallel side portions, a cross portion, and a loop in the cross portion. The end portions of the side portions are bent transversely inwardly. A pair of mounting brackets are secured to the handle assembly, and each mounting bracket is provided with a groove which is sized to receive one of the side portions of the wire frame and an opening which extends transversely to the groove. The wire frame is mounted on the luggage carrier by flexing the side portions away from each other until the end portions of the frame can be inserted into the openings in the mounting brackets.

5 Claims, 5 Drawing Figures

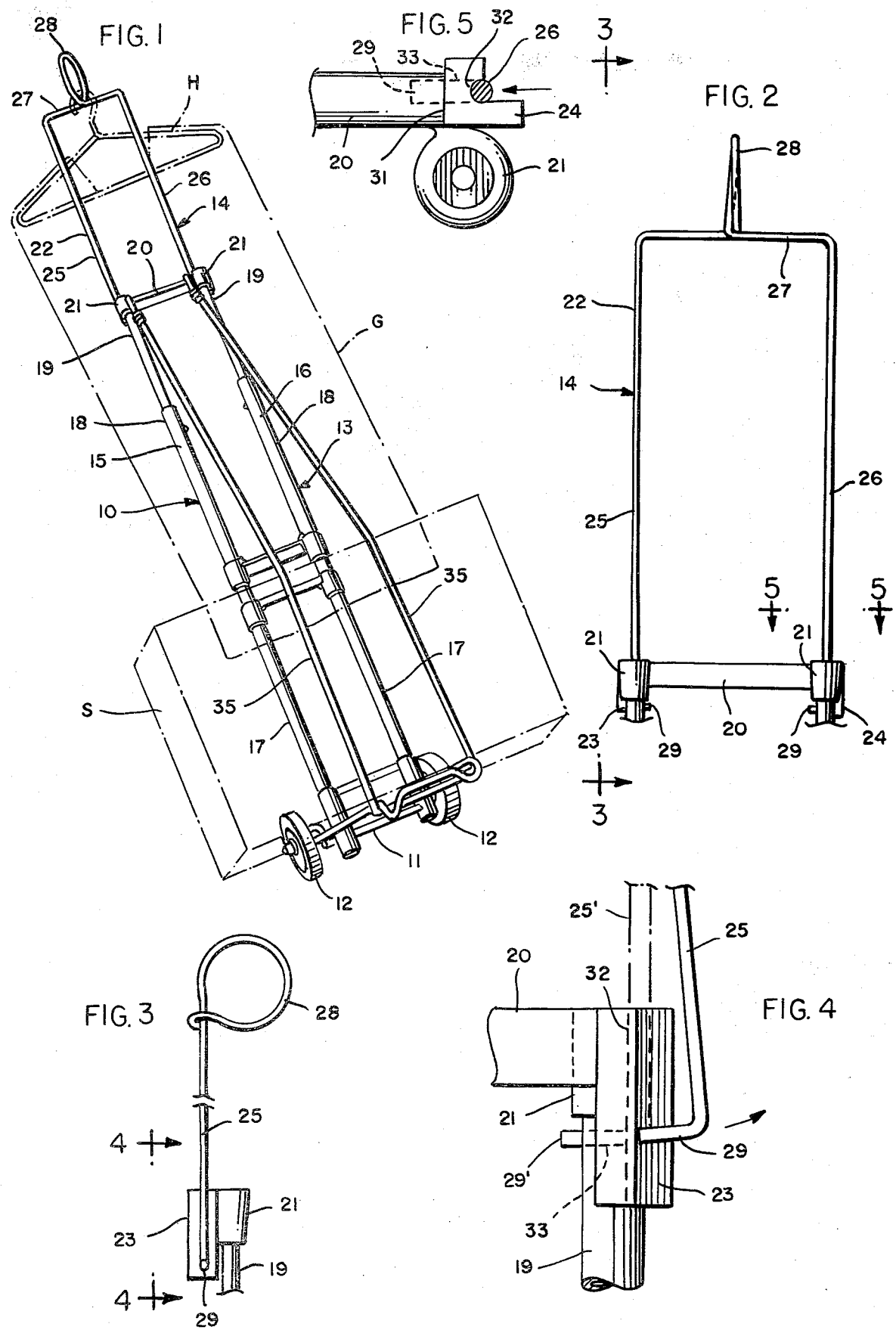

GARMENT BAG ATTACHMENT FOR PORTABLE LUGGAGE CARRIER

BACKGROUND AND SUMMARY

This invention relates to portable luggage carriers, and, more particularly, to a garment bag attachment which is removably mounted on a portable luggage carrier for holding garment bags.

Portable luggage carriers are becoming increasingly common for transporting suitcases and other luggage in airports, train stations, etc. My prior U.S. Pat. Nos. 3,998,476 and 3,612,563 describe two such luggage carriers. Portable luggage carriers usually include a wheel-equipped base for supporting the luggage and a handle which extends upwardly from the base and which is usually collapsible or retractable when the carrier is not being used to permit the carrier to be conveniently stored.

Such luggage carriers are quite advantageous for transporting suitcases, but travellers frequently carry a garment bag in addition to one or more suitcases. Heretofore, luggage carriers have not been designed to carry garment bags, and there is usually no convenient way to support the garment bag on the carrier. If the garment bag is merely draped over the top of the luggage or the handle of the carrier, the garment bag can fall off, particularly in the hustle and bustle of hurrying to catch a plane or a train. Further, the handle of the carrier might not be long enough to support the garment bag in a manner which will prevent the bottom of the garment bag from dragging on the ground. If the garment bag is secured by inserting it between the suitcases and the elastic straps which are generally attached to the luggage carrier, the straps can create wrinkles in the clothes within the garment bag.

The invention provides a garment bag attachment which can be easily mounted on the luggage carrier when needed and removed from the luggage carrier when the garment bag attachment is no longer needed or when the luggage carrier is stored. The garment bag attachment is formed from a single wire rod which is bent into a U shape, and the wire rod is mounted on the luggage carrier merely by flexing the side portions of the rod apart and inserting the transverse end portions into the openings in the mounting bracket. The garment bag attachment extends upwardly from the upper end of the handle so that the full length of the garment bag will be supported without touching the ground. Even though the garment bag attachment is lightweight, economical, and easily attached and detached, it is securely supported by the two spaced mounting brackets.

DESCRIPTION OF THE DRAWING

The invention will be explained in conjunction with an illustrative embodiment shown in the accompanying drawings, in which;

FIG. 1 is a perspective view of a portable luggage carrier equipped with a garment bag attachment formed in accordance with the invention;

FIG. 2 is a front elevational view of the garment bag attachment mounted on the luggage carrier;

FIG. 3 is a side elevational view, partially broken away, taken along the line 3—3 of FIG. 2;

FIG. 4 is a fragmentary view taken along the line 4—4 of FIG. 3 showing one side of the garment bag attachment being removed; and FIG. 5 is a fragmentary sectional view taken along the line 5—5 of FIG. 4.

DESCRIPTION OF SPECIFIC EMBODIMENT

Referring to FIG. 1, a portable luggage carrier 10 includes a base 11 which is supported by a pair of wheels 12 and a handle assembly 13 which extends upwardly from the base. A garment bag attachment designated generally by the numeral 14 extends upwardly from the top of the handle assembly. The particular luggage carrier illustrated in the drawing is equipped with a handle assembly made in accordance with U.S. Pat. No. 3,998,476 to which reference may be had for details. It will be understood, however, that the garment bag attachment can be used with other handles.

The handle assembly includes a pair of parallel spaced-apart handle members 15 and 16 which extend upwardly from the base. In the embodiment illustrated, each of the handle members is comprised of three telescoping tubes 17, 18, and 19. A cross brace or gripping handle 20 is connected to the upper ends of the two upper tubes 19. The cross brace includes a pair of tubular sockets 21 on each end into which the tubes 19 are inserted.

The garment bag attachment includes a rod-like frame 22 and a pair of mounting brackets 23 and 24 which are secured to the opposite ends of the cross brace 20. The rod-like frame has a general inverted U shape and is formed integrally by bending or forming a metal rod to form a pair of spaced-apart parallel side rod portions 25 and 26 and a cross rod portion 27. A central loop 28 is formed in the cross portion, and the plane of the loop extends transversely to the cross portion. Referring to FIG. 4, each of the side portions 25 and 26 includes a transverse end portion 29 which extends inwardly toward the other side portion.

As can be seen in FIG. 5, the sockets 21 on each end of the cross brace 20 are offset from the longitudinal axis of the cross brace, and each mounting bracket 24 is secured to one of the flat end surfaces 31 of the cross brace. Both the cross brace and the mounting brackets are advantageously molded from plastic, and the brackets can be secured to the cross brace by adhesives, solvents, etc. Each mounting bracket is generally J-shaped in transverse cross section and is provided with a trough or groove 32 which extends parallel to the adjacent upper tube 19 of the handle assembly. A cross opening 33 (see also FIG. 4) extends through the bracket perpendicularly to the groove adjacent the lower end of the bracket.

The diameter of the semi-cylindrical groove 32 is substantially the same as the diameter of the side portions 25 and 26 of the frame of the garment bag attachment, and the diameter of the opening 33 is substantially the same as the diameter of the end portions 29 of the frame. The frame is formed from a flexible and resilient metal rod, and the frame is secured to the mounting brackets merely by flexing the side rod portions 25 and 26 apart, positioning the end portions 29 adjacent the openings 33 in the mounting brackets, and releasing the side portions to permit the end portions to fit into the openings. The distance between the grooves 32 and the two mounting brackets is approximately the same as or slightly greater than the distance between the side portions 25 and 26 of the frame when the side portions are not flexed, and each of the side portions will lie in one of the grooves. The side portions are thereby secured against rotation about the axis of the end portions 29, and the end portions secure the frame against movement in a direction parallel to the handle assembly.

Referring to FIG. 1, when the frame of the garment bag attachment is held by the mounting brackets, the loop portion 28 extends forwardly from the cross rod 27. A hanger H of a garment bag G can be inserted through the loop, and the garment bag will be supported by the loop in a fully extended position. A suitcase S is supported by the base 11 and the lower portion of the handle assembly 13 and secured by elastic straps 35 which are hooked to the cross brace 20 of the handle. The garment bag can be merely draped over the straps and the suitcase. The side portions 25 and 26 of the frame position the loop 28 well above the upper end of the handle assembly, and the garment bag will not be allowed to drag on the ground even if the telescoping handle is retracted from its FIG. 1 position.

The long side of each of the J-shaped mounting brackets is positioned toward the front of the luggage carrier (see FIG. 5) and this long side acts as a barrier to prevent the side portions 25 and 26 of the frame from rotating out of the grooves 32 of the mounting brackets under the influence of the weight of the garment bag when the luggage carrier is standing upright. When the luggage carrier is tilted as in FIG. 1 for wheeling along the ground, much of the weight of the garment bag is supported by the handle assembly, and the force tending to rotate the side portions of the frame about the axis of the end portions 29 is not as great.

When the luggage carrier is being stored or when a garment bag is not being carried, the frame of the garment bag attachment can be detached from the mounting brackets merely by spreading the side portions 25 and 26 as illustrated in FIG. 4 until the end portions 29 are withdrawn from the openings 33 of the mounting brackets. The garment bag supporting position of the frame is illustrated in phantom in FIG. 4 at 25' and 29'. The mounting brackets are advantageously permanently secured to the cross brace 20, and remain on the luggage carrier when the frame is removed.

Although in the particular embodiment illustrated and described, the end portions 29 of the frame extend toward each other and the side portions are removed from the mounting brackets by pulling them apart, the end portions could also extend away from each other, and the side portions could be removed by pulling them together.

While in the foregoing specification a detailed description of a specific embodiment of the invention was set forth for the purpose of illustration, it will be understood that many of the details hereingiven may be varied considerably by those skilled in the art without departing from the spirit and scope of the invention.

I claim:

1. A garment bag attachment for a portable luggage carrier, the luggage carrier including a base and a handle assembly including a pair of parallel spaced-apart handle members extending upwardly from the base, the garment bag attachment comprising a frame having a general inverted U shape and including a pair of parallel side rod portions extending upwardly from the handle assembly and a cross rod portion extending between the upper ends of the side rods portions, and a loop portion on the cross rod portions providing an opening through which the hanger of a garment bag can be inserted, and a pair of mounting members secured to the handle assembly at spaced-apart locations, each mounting member having a groove extending parallel to one of the side rod portions of the frame and receiving and supporting the side rod portions and an opening extending through the mounting member perpendicular to the groove, each of the side rod portions including an end portion which extends perpendicularly to the remainder of the side rod portion and which is inserted through the opening in the associated mounting member.

2. The garment bag attachment of claim 1 in which the frame is formed integrally from a metal rod which is bent to form the side rod portions, the cross rod portion, and the loop portion.

3. The garment bag attachment of claim 1 in which the side rod portions are formed from flexible and resilient metal whereby the frame of the garment bag attachment can be detached from the mounting members by flexing the side rod portions away from the grooves in the mounting members to withdraw the end portions from the openings in the mounting members.

4. The garment bag attachment of claim 1 in which the handle assembly includes a brace extending transversely between the handle members adjacent the upper end thereof, the mounting members being secured to the opposite ends of the brace.

5. A garment bag attachment for a portable luggage carrier, the luggage carrier including a base and a handle assembly including a pair of parallel spaced-apart handle members extending upwardly from the base, the garment bag attachment comprising an integral flexible and resilient metal rod which is bent to form a general inverted U shape having a pair of parallel side rod portions extending upwardly from the handle assembly, a cross rod portion extending between the upper ends of the side rod portions, and a loop portion on the cross rod portion providing an opening through which the hanger of a garment bag can be inserted, each of the side rod portions including an end portion which extends perpendicularly to the remainder of the side rod portion, the handle assembly including a brace extending transversely between the handle members adjacent the upper ends thereof, and a pair of mounting members secured to the opposite ends of the brace, each mounting member having a groove extending parallel to one of the side rod portions and an opening extending through the mounting member perpendicularly to the groove, each of the side rod portions being positioned in the groove of one of the mounting members and each of the end portions extending through the opening of one of the mounting members whereby the metal rod can be detached from the mounting members by flexing the side portions away from the grooves in the mounting members to withdraw the end portions from the openings in the mounting members.

* * * * *